(No Model.)

M. WADDELL.
ADJUSTER FOR FIELD MAGNETS OF DYNAMO ELECTRIC MACHINES OR MOTORS.

No. 527,225. Patented Oct. 9, 1894.

WITNESSES:

INVENTOR
Montgomery Waddell,
BY
ATTORNEYS.

UNITED STATES PATENT OFFICE.

MONTGOMERY WADDELL, OF BRIDGEPORT, CONNECTICUT, ASSIGNOR TO MONTGOMERY WADDELL, RECEIVER OF THE WADDELL-ENTZ COMPANY, OF WEST VIRGINIA.

ADJUSTER FOR FIELD-MAGNETS OF DYNAMO-ELECTRIC MACHINES OR MOTORS.

SPECIFICATION forming part of Letters Patent No. 527,225, dated October 9, 1894.

Application filed September 6, 1893. Serial No. 484,920. (No model.)

*To all whom it may concern:*

Be it known that I, MONTGOMERY WADDELL, a resident of Bridgeport, Fairfield county, State of Connecticut, have invented an Improved Magnet-Adjuster, of which the following is a specification.

My invention relates to dynamo electric machines and motors, and has for its object to provide a means for adjusting the magnets to compensate for the slight change of position of the armature, due to the wear of the bearings and kindred causes. I attain this object by the mechanism illustrated in the accompanying drawings, in which—

Figure 1:
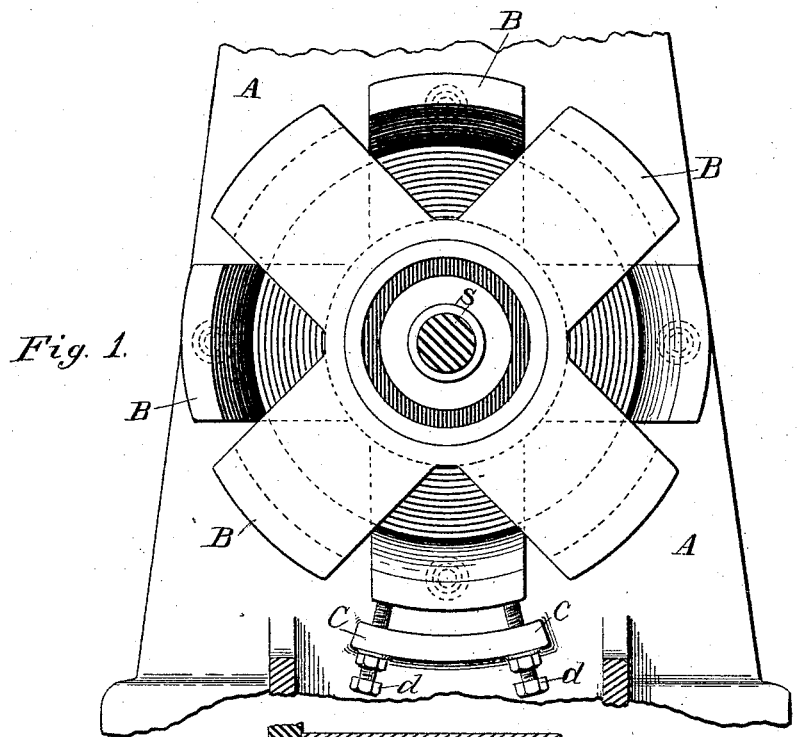
Figure 2:
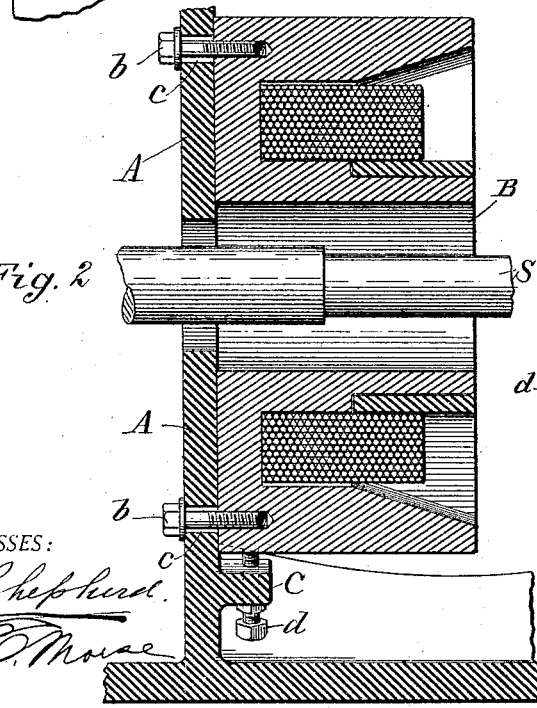
Figure 3:
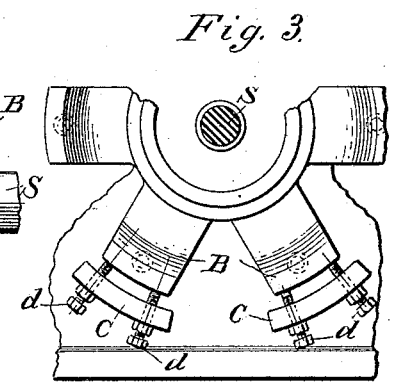

Figure 1 is a face view of the field magnets of a dynamo machine or motor. Fig. 2 is a central vertical longitudinal section of the field magnets of Fig. 1. Fig. 3 is a view showing the invention applied to another type of dynamo or motor, viz: a twelve pole machine, so called.

In the drawings A is the frame of the machine to which the field magnets B are attached by any suitable means preferably by screws $b$ passing through perforations $c$ in the frame in order to allow for a desired movement of the magnets on the frame A. Upon the frame A is mounted any suitable adjusting device, shown as a rib C cast integral therewith to receive screws $d$ which bear upon the magnets B. These adjusting devices which may be independently supported or which may be mounted directly upon the field magnets and bear upon a suitable support also assist to support the field magnets.

S is the armature shaft upon which the armature may be mounted in any suitable manner.

In the machine illustrated and in many other dynamo machines the armature is made to revolve in close proximity to the field and concentric with the working faces of the pole pieces thereof, and for the sake of economy in generation the clearance is made as small as prudence will allow. From this it will be obvious that a very small change in the relative position of the parts, such as the shaft getting out of alignment, or the wearing of the bearings, will cause the armature and pole pieces to come in contact, resulting in great injury to the machine as well as the inconvenience of stoppage and enforced idleness of the machine. My invention seeks to obviate this difficulty.

When, from any cause. the relative position of the armature and field become altered and any eccentricity or lateral displacement is developed, the parts may be centered by loosening the screws $b\ b$ and manipulating either or both of the screws $d\ d$ to raise, lower or swing the magnets. The screws $b\ b$ are then tightened to securely hold the magnets in their adjusted position. The perforations $c$ are of sufficient size to allow for the slight necessary movement of the screws $d$, it being understood that the clearance between armature and field being very small the adjustment required is at all times minute.

In Fig. 3 I have shown a slightly different arrangement of adjusting devices. In this figure I have shown a twelve pole generator, so called, and two sets of adjusting screws in order to form a more stable support and to facilitate sidewise adjustment. It will be understood that this type of machine has the usual supports for the magnets.

I do not limit myself to the precise construction and arrangement shown, nor to any specific device for accomplishing the result attained which is the adjustment of the magnets of a dynamo machine or motor to compensate for the displacement of the parts incident upon use or abuse.

What I claim, and desire to secure by Letters Patent, is—

1. In a dynamo or motor, a perforated frame, fastening devices extending through the perforations to support the field magnets, and a support mounted on the frame carrying adjusting devices upon which the field magnets rest, substantially as described.

2. In a dynamo or motor a magnet supporting frame A, perforations $c$ in said frame, screws $b$ extending through the perforations to support and adjust field magnets B, a support C carrying adjusting screws $d$ mounted on frame A, substantially as shown and described.

3. An adjuster for field magnets for dynamos or motors consisting of a supporting frame A, a support C mounted thereon and carrying screws $d$, as and for the purposes specified.

MONTGOMERY WADDELL.

Witnesses:
HARRY M. TURK,
CHARLES E. SMITH.